Oct. 10, 1939.  O. RASMUSSEN  2,175,445
HYDRAULIC BRAKE
Filed July 16, 1937  2 Sheets-Sheet 2
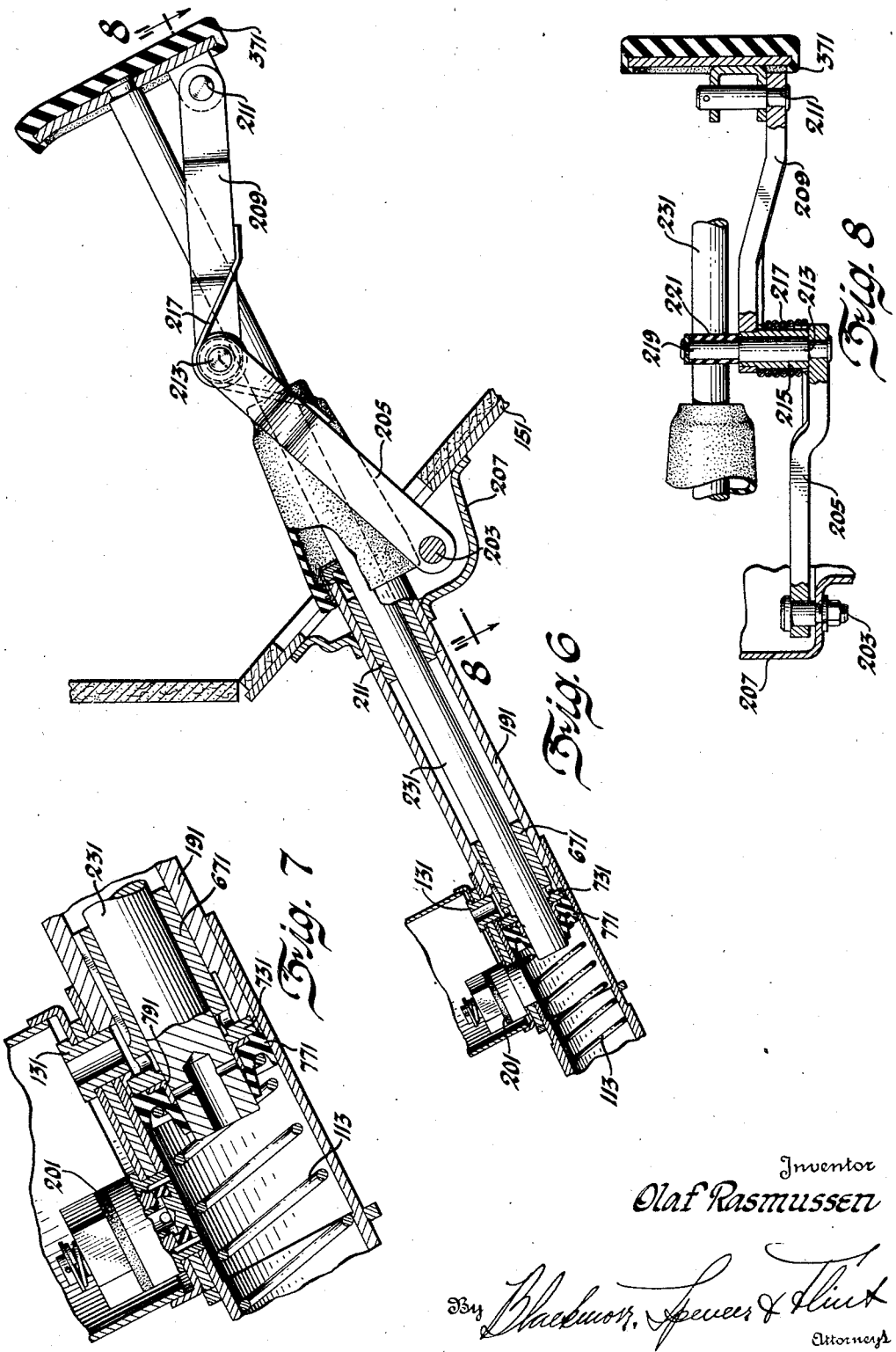
Inventor
Olaf Rasmussen Patented Oct. 10, 1939

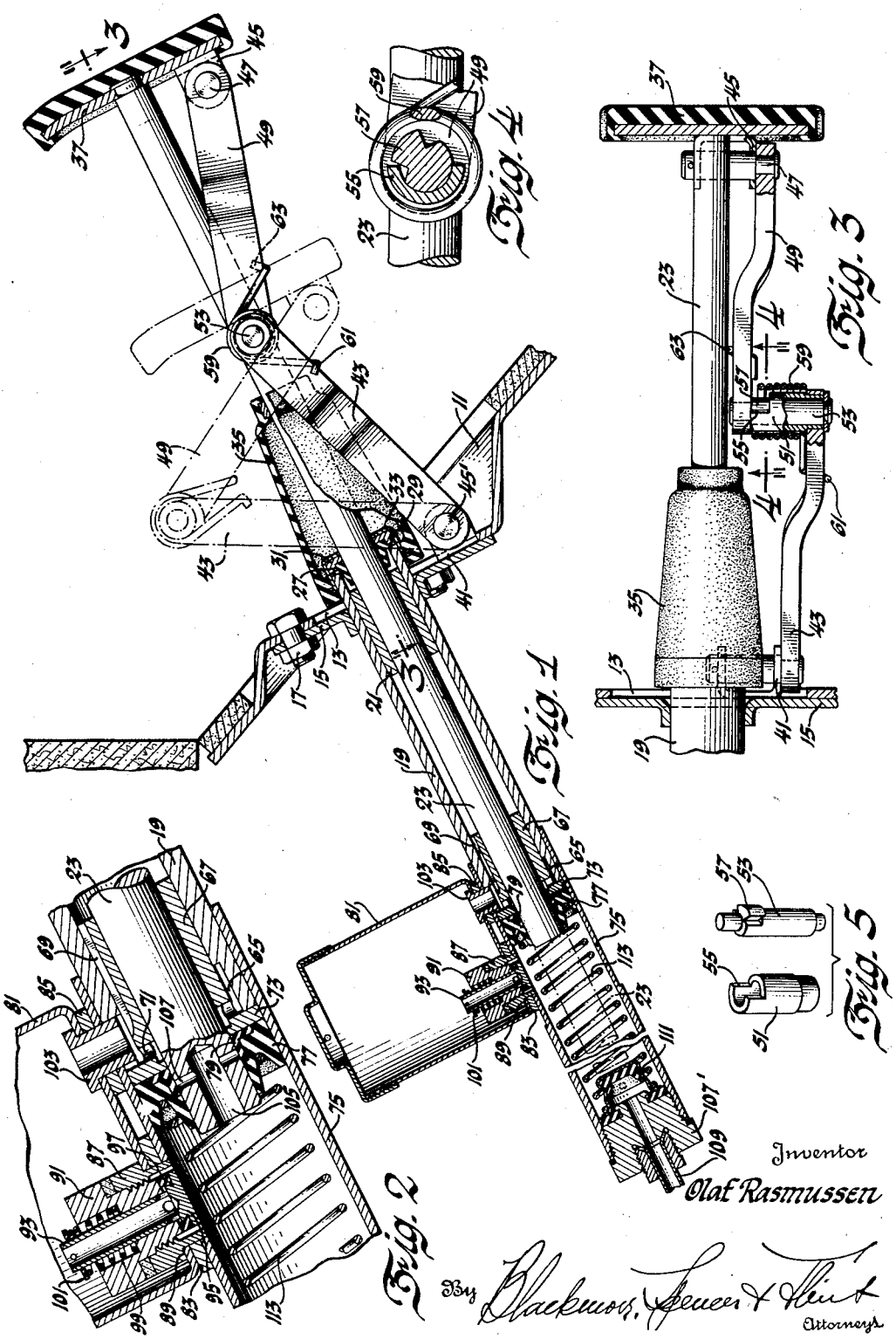

2,175,445

UNITED STATES PATENT OFFICE 2,175,445

HYDRAULIC BRAKE

Olaf Rasmussen, Dayton, Ohio, assignor to General Motors Corporation, Detroit, Mich., a corporation of Delaware Application July 16, 1937, Serial No. 153,915

5 Claims. (Cl. 74—512)

This invention relates to hydraulic operating systems such as are used for applying brakes and releasing clutches on motor vehicles. Such systems employ a so-called master cylinder from which hydraulic medium is transmitted to other devices, such as wheel cylinders in the case of brakes, for performing the work to be done by the system.

The present invention is concerned with the master cylinder of such a system.

An object of the invention is to improve the mechanism by which the piston or plunger of the master cylinder is yieldingly restored after being depressed.

Another object is to provide novel means to prevent the rotation of the plunger about its longitudinal axis.

Still another object is to so mount the plunger return spring that to overcome its increasing tension as the plunger advances may require no appreciable added manual pressure on the pedal pad.

As another object the invention contemplates an improved sealing device for the plunger, one which shall minimize friction between itself and the plunger and to thereby make possible a relatively light return spring and a consequently reduced pedal pressure.

Other objects and advantages will be understood from the following description:

Figure 1 is a longitudinal sectional view through the master cylinder of a hydraulic system.

Figure 2 is a similar sectional view of a part of the cylinder and on an enlarged scale.

Figure 3 is a view substantially as seen from line 3—3 of Figure 1.

Figure 4 is a section on line 4—4 of Figure 3.

Figure 5 shows a perspective, two cooperating details in disassembled relation.

Figure 6 is a view like Figure 1 but showing a modification.

Figure 7 is an enlarged section of a part of the cylinder shown in Figure 6.

Figure 8 is a view substantially as seen from line 8—8 of Figure 6.

Referring to the drawings and first to Figures 1 to 5 inclusive, numeral 11 is used to designate a part of the floor board of the operator's compartment of the motor vehicle. It has an opening 13 covered by a plate 15 secured to the floor board by fastening means 17. The plate 15 carries secured thereto in any way desired, a cylinder 19 which cylinder extends through the opening 13. Within the cylinder 19 and spaced from its upper end is a guide 21 for a piston or plunger 23. Within and at the end of the cylinder is a rubber seal 27 having an annular flange 29 seated against the end of the cylinder and engaged by cap 31 which is held in position by a retainer 33. Engaging around the end of the cylinder 19 above the floor board and also gripping the piston 23 is a flexible boot 35. At the extreme end of the plunger or piston 23 is a pedal or pad 37. Pivoted to a lug 41 on plate 15 is a link 43. Numeral 45' represents the pivot pin. Pivoted to a lug 45 on the pedal pad 37 by a pin 47 is a second link 49. The adjacent ends of the links 43 and 49 are pivoted together by parts such as appear in Figure 5. A hollow sleeve 51 is fitted into the end of the lever 43. Secured to the end of lever 49 is a pin 53. Pin 53 extends through the sleeve 51. Suitable formations on the sleeve and pin marked 55 and 57 are adapted to engage when the links move from the dotted line position of Figure 1 and reach the full line position of Figure 1. The expedient prevents alignment of the links and the locking of the piston in an outermost position. A spring 59 is coiled about the sleeve 51, its ends 61 and 63 being engaged under the links 43 and 49. The spring is tensioned to bias the links toward a position of alignment. Pressure on the pedal 37 causes the links to swing from the full line position to the dotted line position. Additional stress is thus imparted to the spring giving it the energy to restore the links to their full line position. It may be mentioned at this point that the position of the spring changes as the pedal is depressed in a way to give added leverage to the force acting on the pedal against the spring with the result that little if any added force is required as the parts are moved to project the piston into the cylinder. This is of importance especially when the master cylinder is used in the system adapted for releasing the clutch. It is of less importance in the brake system.

Within the opposite end of cylinder 19 is formed an annular groove 65. Fitted within this end of cylinder 19 is a guide 67 having a channel 69 opening into the groove 65 and communicating with the space within the cylinder 19 between the two guides. Guide 67 has openings 71 communicating with groove 65. A suitable abutment 73 closes the end of cylinder 19 and fits the inner wall of a second cylinder 75 which is the master cylinder proper and which overlies the end of cylinder 19. A rubber seal 77 seats against the wall of cylinder 75, against the abutment 73 and also against the reciprocating piston 23.

An angular bushing 79 is received within a recessed portion of the rubber seal and engages the abutment along one face and the piston along its other face thus reducing the area of contact between the rubber and the piston. This bushing may be of hard rubber as shown in Figure 1 or it may be of metal or other material. It will be seen that the friction between the rubber seal and the piston is additive being least at the end of the lip and increasing toward the base of the seal. By using the bushing referred to above the region where the friction would be most severe is occupied by the bushing.

In this way the frictional resistance to the return of the piston is lessened, making it possible to use much lighter return spring 59 than would otherwise be required. For this reason, too, the pedal pressure is reduced since it is operating against a lighter spring. The fit of the bushing 79 against the piston is such that no appreciable leakage can occur even in the event of failure of the rubber, never being sufficient to prevent the necessary build-up of pressure within the cylinder 75.

A supply reservoir is employed as usual with the master cylinder. It is shown at 81 supported from the combined cylinders by spacers 83 and 85. Extending through part 83 and press-fitted into the cylinder 75 is an internally threaded plug 87. The plug has a shoulder 89 engaging the inner wall of the reservoir. A valve nut 91 is threaded into the plug 87. A hollow valve 93 having a head 95 provided with a rubber ring 97 reciprocates within the nut, the rubber ring engaging the end of the nut to close the passage through the hollow valve.

A spring 99 within a recess of the nut engages an abutment 101 carried by the valve to normally hold the latter seated. A hollow plug 103 has a shoulder seated around a second opening in the reservoir. Through this plug, the interior of the reservoir is always in communication with the region of the cylinder 19 between the guides. The end of the piston has an axial opening 105 and radial passages leading therefrom at 107. The interior of cylinder 75 is in communication with the reservoir when the piston is sufficiently withdrawn so that passages 105 and 107 may register with openings 71.

To the lower end of cylinder 75 may be secured a threaded plug 107' for the attachment of a conduit 109 leading to suitable operating devices, wheel cylinders for example in case the master cylinder is used for applying brakes. If it be desired, there may be used a valve adjacent this plug, the essential purpose of which is to maintain some predetermined pressure in the conduit. No invention is herein claimed for such a valve broadly or specifically and numeral 111 is used to designate what may be any preferred form of valve. To hold the rubber seal 77 against the abutment as the piston reciprocates therethrough, there is used a light spring 113 as shown on the drawings.

In Figures 6, 7 and 8 is shown a form of the invention having certain modifications. In this embodiment, cylinder 191 is provided with similar internal guides 211 and 671 through which piston rod 231 reciprocates. The end of cylinder 191 is recessed to receive the abutment 731 for the seal 771. In this case the bushing 791 may be of brass. The part 131 corresponds with 103 of Figure 1 as does the valve assembly 201 with the corresponding parts of the form first described.

At 203 link 205 is pivoted to a stamping 207 beneath the floor board 151. Link 209 is pivoted to pad 371 by a pin 211. Links 205 and 209 are pivoted together by the pin 213 and bushing 215 and the latter is surrounded by a spring 217 like the spring 59. In place of the stop device of Figure 1 the pin is extended as at 219 and surrounded by a rubber bushing 221 adapted to engage the piston rod 231. This engagement prevents the alignment of the link and the locking of the piston rod in an outermost position. In other respects this form of the invention is not materially unlike the form first described.

When the pedal is depressed the piston displaces the fluid from the master cylinder because escape to the reservoir by way of the passage at the end of the piston is cut off and because the built-up pressure within the cylinder closes the valve between the master cylinder and the reservoir. During this movement the mechanical advantage of the pedal pressure against the return spring progressively increases whereby no high pedal pressure is required. The friction between the rubber seal and the rod is minimized because of the use of the little bushing associated with the rubber seal. It is thereby possible to use a comparatively light return spring. The suction which tends to develop in the master cylinder as the piston withdraws may be relieved by means of the valve. Also toward the end of the piston stroke, fluid may enter the cylinder from the reservoir by way of the passages at the end of the piston. After the brake shoe return springs restore the fluid to the master cylinder, the excess fluid may reach the reservoir through these same passages as will be understood. The limiting position of the piston as determined by the jointed links is such that the piston never telescopes completely through the rubber seal. There is therefore no danger of fluid passing between the piston and the seal.

The linkage prevents the rotation of the piston, such rotation as might be the occasion of the slipping of the operator's foot from the pedal pad. It also affords a very desirable location for the return spring permitting the necessary added spring pressure as the pedal is depressed but without substantially increasing the required pressure on the pedal.

I claim:

1. A cylinder, a piston reciprocable therein, means to reciprocate said piston within said cylinder, links jointed at their adjacent ends, one extreme end pivoted on a fixed axis adjacent said cylinder and the other extreme end pivoted to said means whereby the piston is restrained from rotation on its axis, together with yielding rod restoring means associated with said jointed adjacent ends.

2. A cylinder, a piston reciprocable therein, means to reciprocate said piston within said cylinder, links jointed at their adjacent ends, one extreme end pivoted on a fixed axis adjacent said cylinder and the other extreme end pivoted to said means whereby the piston is restrained from rotation on its axis, and means associated with said jointed ends to engage and prevent alignment of said links.

3. A cylinder, a piston reciprocable therein, means to reciprocate said piston within said cylinder, links jointed at their adjacent ends, one extreme end pivoted on a fixed axis adjacent said cylinder and the other extreme end pivoted to said means whereby the piston is restrained from rotation on its axis, together with a pivot pin for said adjacent jointed ends, said pin being extended and adapted to engage said piston.

4. A cylinder, a piston reciprocable therein, means to reciprocate said piston within said cylinder, links jointed at their adjacent ends, one extreme end pivoted on a fixed axis adjacent said cylinder and the other extreme end pivoted to said means whereby the piston is restrained from rotation on its axis, together with a pivot pin for said adjacent jointed ends, said pin being extended and adapted to engage said piston, and a bushing of rubber or other resilient material on said pin extension.

5. A cylinder, a piston reciprocable therein, means to reciprocate said piston within said cylinder, links jointed at their adjacent ends, one extreme end pivoted on a fixed axis adjacent said cylinder and the other extreme end pivoted to said means whereby the piston is restrained from rotation on its axis, the construction for joining said adjacent ends being a hollow sleeve secured to one link, a pin secured to the other link and extending through said sleeve, said sleeve and pin having engaging parts to provide a stop and to prevent link alignment.

OLAF RASMUSSEN.